United States Patent
Wang et al.

(10) Patent No.: US 8,896,693 B2
(45) Date of Patent: Nov. 25, 2014

(54) SYSTEM AND METHOD FOR MONITORING MULTIPLE TARGETS USING A SINGLE CAMERA

(75) Inventors: Weng Lyang Wang, Saratoga, CA (US); Shengmin Lin, Santa Clara, CA (US)

(73) Assignee: CMOS Sensor Inc., Cupertino, CA (US)

( * ) Notice: Subject to any disclaimer, the term of this patent is extended or adjusted under 35 U.S.C. 154(b) by 481 days.

(21) Appl. No.: 13/396,446

(22) Filed: Feb. 14, 2012

(65) Prior Publication Data

US 2013/0208110 A1    Aug. 15, 2013

(51) Int. Cl.
*H04N 7/18*    (2006.01)

(52) U.S. Cl.
USPC ......................................................... 348/143

(58) Field of Classification Search
None
See application file for complete search history.

(56) References Cited

U.S. PATENT DOCUMENTS

| | | | |
|---|---|---|---|
| 2009/0225189 A1* | 9/2009 | Morin | 348/229.1 |
| 2009/0290043 A1* | 11/2009 | Liu et al. | 348/223.1 |
| 2009/0292413 A1* | 11/2009 | Kubotani et al. | 701/29 |
| 2012/0038817 A1* | 2/2012 | McMackin et al. | 348/345 |

* cited by examiner

*Primary Examiner* — William C Vaughn, Jr.
*Assistant Examiner* — Eileen Adams
(74) *Attorney, Agent, or Firm* — Wuxi Sino IPs Ltd.; Joe Zheng (57) ABSTRACT

Techniques to monitor multiple targets with a single camera are disclosed. In one embodiment, an image sensor is provided with two or more readout circuits, each operating independently and is designed to read out charges from a designated area of the image sensor. When two or more designated sensing areas in the image sensor are being focused onto different objects and read out respectively, such an image sensor is capable of monitoring multiple targets. When placed in traffic surveillance, a camera equipped with such an image sensor is able to monitor multiple forward and backward lanes in near or far field. Further with the control of the designated areas, different resolutions of the images may be produced.

11 Claims, 11 Drawing Sheets

*(prior art)*

SYSTEM AND METHOD FOR MONITORING MULTIPLE TARGETS USING A SINGLE CAMERA

BACKGROUND OF THE INVENTION

1. Field of the Invention

The present invention is related to the area of image sensors and surveillance. More particularly, the present invention is related to CMOS sensors with high-sensitivity, and system and method for monitoring multiple targets using a single camera.

2. Description of Related Art

Surveillance is the monitoring of the behavior, activities, or other changing information, usually of people for the purpose of influencing, managing, directing, or protecting. In general, the word surveillance is applied to observation from a distance by means of electronic equipment (such as CCTV cameras), or interception of moving information (such as various traffic).

Surveillance is very useful to governments and law enforcement to maintain social control, recognize and monitor threats, and prevent or investigate dangerous activity. With the advent of sophisticated surveillance systems in place, various agencies now possess the unprecedented ability to monitor the activities of their subjects.

Traffic cameras are an innovative and extremely functional use of video surveillance technology. They are atop traffic signals and placed along busy roads, and at busy intersections of the highway. Whether they are recording traffic patterns for future study and observation or monitoring traffic and issuing tickets for moving violations, traffic cameras are an explosively popular form of video surveillance.

It is commonly seen that multiple cameras are often in place to monitor a section of road. When there are eight forward and backward lanes in a typical highway, four or eight cameras are often used, each is configured to monitor one or two lanes. Besides the installation complexity involving an overhead structure across the lanes, the cost of the cameras and the associated supporting system to control the cameras is of extremely high.

Accordingly, there is a need for traffic surveillance systems that can be installed and put into use without the associated installation complexity and costs. Further there is a need for a surveillance system capable of monitoring multiple targets using one camera or a single image sensor.

In the application of video surveillance, the characteristics of the image sensor(s) being used is very important to the entire surveillance system. An image sensor is a device that converts a scene or an optical image into an electronic signal. There are essentially two types of image sensors, charge-coupled device (CCD) or complementary metal-oxide-semiconductor (CMOS) image sensors. In general, CCD image sensors are more expensive than CMOS image sensors because CMOS sensors are less expensive to manufacture than CCD sensors. CMOS image sensors can potentially be implemented with fewer components, use less power, and/or provide faster readout than CCD image sensors can. Thus CMOS image sensors are getting considerable attentions. Another common understanding is that CCD image sensors are more sensitive to light variations than CMOS image sensors. Thus there is a further need for techniques that can enhance the sensitivity of CMOS image sensors.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of image sensors and its practical uses. According to one aspect of the image sensors in the present invention, subpixels within a pixel are designed without significantly increasing the cell or pixel area of the pixel. The readouts from the subpixels are accumulated to increase the sensitivity of the pixel without increasing the area of the image sensor. According to one aspect of the image sensors in the present invention, subpixels within a pixel are respectively coated with filters, each designed for a frequency range. Thus the frequency response of a CMOS image sensor can be enhanced significantly according to application.

According to another aspect of the present invention, an image sensor is provided with two or more readout circuits, each operating independently and is designed to read out charges from a designated area of the image sensor. When two or more designated sensing areas in the image sensor are being focused onto different objects and read out respectively, such an image sensor is capable of monitoring multiple targets. When placed in traffic surveillance, a camera equipped with such an image sensor is able to monitor multiple forward and backward lanes. Further with the control of the designated areas, different resolutions of the images may be produced.

The present invention may be implemented in various ways including an apparatus or a system. According to one embodiment, the present invention is an image sensor comprising an array of pixels, each of the pixels including: N subpixels producing N sensing signals when the image sensor is operated to sense a scene; N readout circuits coupled respectively to the N subpixels to read out N sensing signals from the N subpixels, wherein each of the N readout circuits is coupled to one of the N subpixels to read out one sensing signal therefrom; and an integrator provided to combine the N sensing signals of the N subpixels to produce a final sensing signal of a pixel.

According to another embodiment, the present invention is an image sensor comprising an array of pixels, each of the pixels including: N subpixels producing N sensing signals when the image sensor is operated to sense a scene, each of the N subpixels being integrated with a different optical filter to transmit a predefined frequency band; N readout circuits coupled respectively to the N subpixels to read out N sensing signals from the N subpixels, wherein each of the N readout circuits is coupled to one of the N subpixels to read out one sensing signal therefrom; and N independent integrators provided respectively to output the N sensing signals. Some of the sensing signals are enough to reproduce visible color images while another some of the sensing signals facilitate to detect nonvisible objects in the scene under low lighting condition.

According to yet another embodiment, the present invention is a camera for monitoring multiple targets, the camera comprises an image sensor being divided into N non-overlapping sensing areas respectively controlled by N integration times to ensure that each of the sensing areas outputs a properly-exposed sensing signal when the camera is operated to sense a scene; and N readout circuits, each of the N readout circuits coupled to one of the sensing areas to read out the properly-exposed sensing signal therefrom when the camera is operated to sense a scene.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 1-7C. However, those skilled in the art will readily appreciate that the detailed description given herein with respect to these figures is for explanatory purposes as the invention extends beyond these limited embodiments.

An active-pixel sensor (APS) is an image sensor includes an integrated circuit containing an array of pixel sensors, each pixel containing a photodetector and an active amplifier. There are many types of active pixel sensors including the CMOS APS. Such an image sensor is produced by a CMOS process (and is hence also known as a CMOS sensor), and has emerged as an alternative to charge-coupled device (CCD) image sensors.

Figure 1:
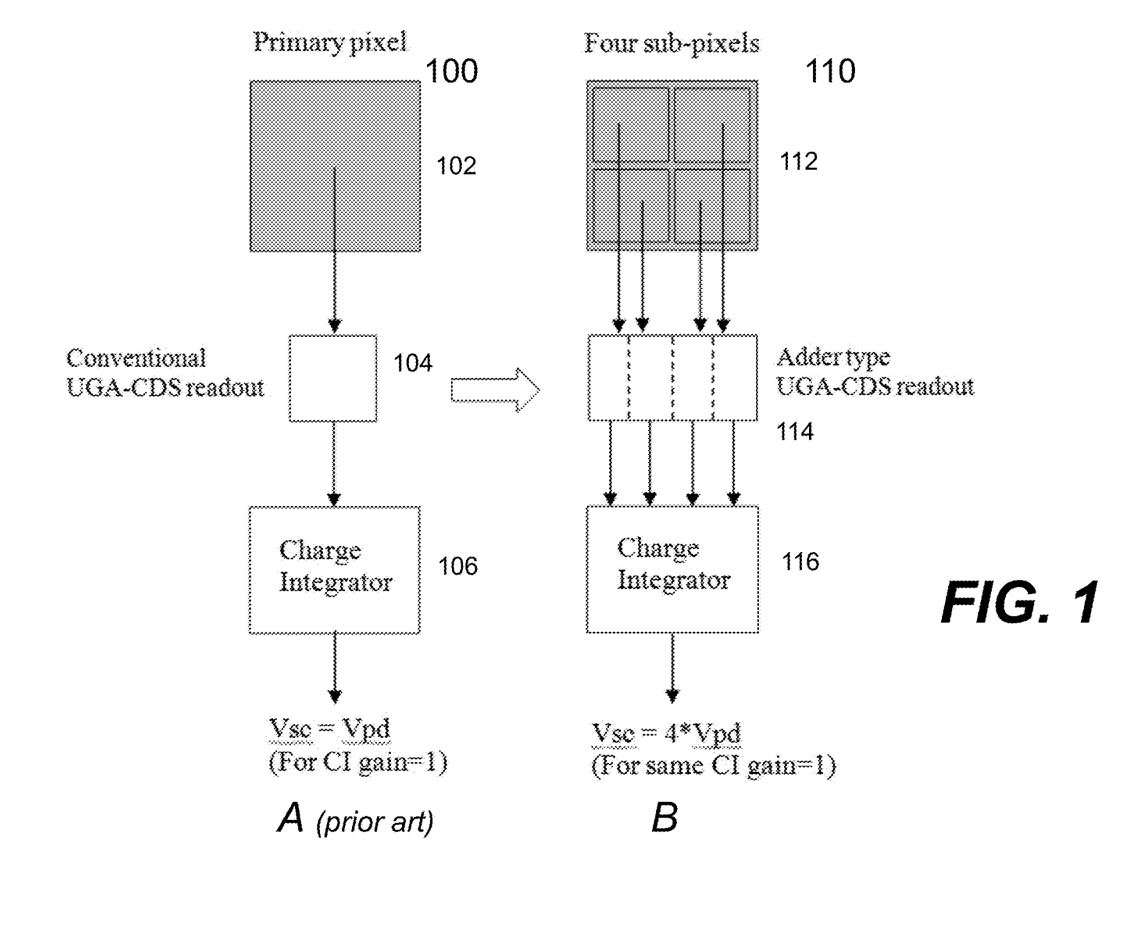
FIG. 1A shows a functional block diagram of a single pixel in an image sensor.
FIG. 1B shows one embodiment of a corresponding pixel according to one embodiment of the present invention.
FIG. 1C shows an exemplary design employing the standard 3 transistors that may be used for the pixel of FIG. 1B.
FIG. 1D shows an exemplary readout circuit employing the correlated double sampling (CDS) circuitry to read out the sensing signal from the pixel of FIG. 1B.
Figure 1C:
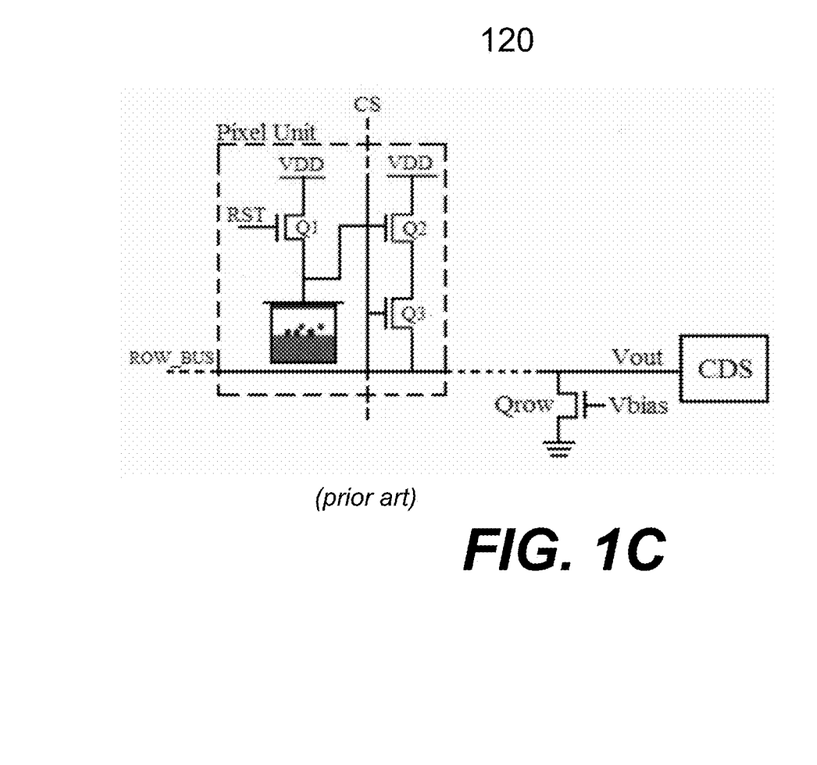

FIG. 1A shows a functional block diagram 100 of a single pixel 102 in an image sensor. When the image sensor (hence the pixel 102) is exposed (e.g., via a shutter) to a scene, charges proportional to the incoming light intensity are accumulated in the pixel 102. FIG. 1C shows an exemplary design 120 employing the standard 3 transistors that may be used for the pixel 102. The current sensing readout circuit of FIG. 1C employs a structure shared by the pixels of a row (or column).

Figure 1D:
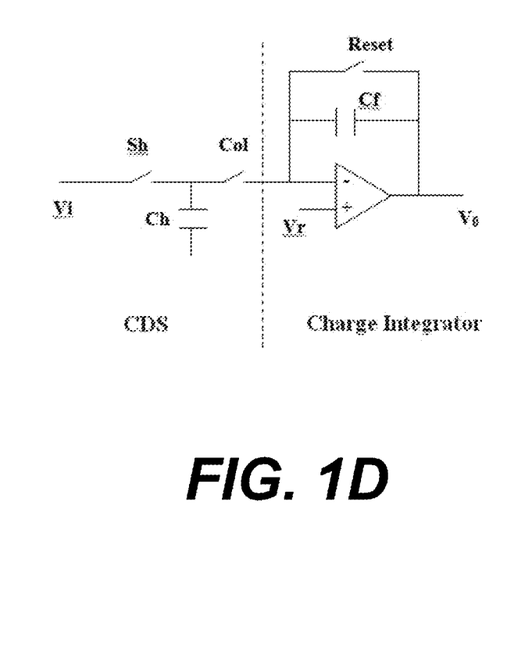

As shown in FIG. 1A, a readout circuit 104 is provided to read out the charges accumulated in proportional to the intensity of the light impinged on the pixel 102. FIG. 1D shows an exemplary readout circuit employing the correlated double sampling (CDS) circuitry to read out the sensing signal from the pixel 102. An amplifier, also referred to as charge integrator 106, is provided to produce a final sensing signal to be coupled for digitization.

To increase the sensitivity of the pixel 102, FIG. 1B shows one embodiment 110 of a corresponding pixel 112 according to one embodiment of the present invention. The pixel 112 includes a number of subpixels. For illustration purpose, the pixel 112 in FIG. 1B shows that there are four subpixels. In operation, the subpixels are respectively impinged by an incoming light. Charge is accumulated in each of the subpixels. An adder-type CDS circuit 114 is provided to combine the readouts from the subpixels. An amplifier, also referred to as charge integrator 116, is provided to produce a final combined sensing signal to be coupled for digitization.

Figure 2:
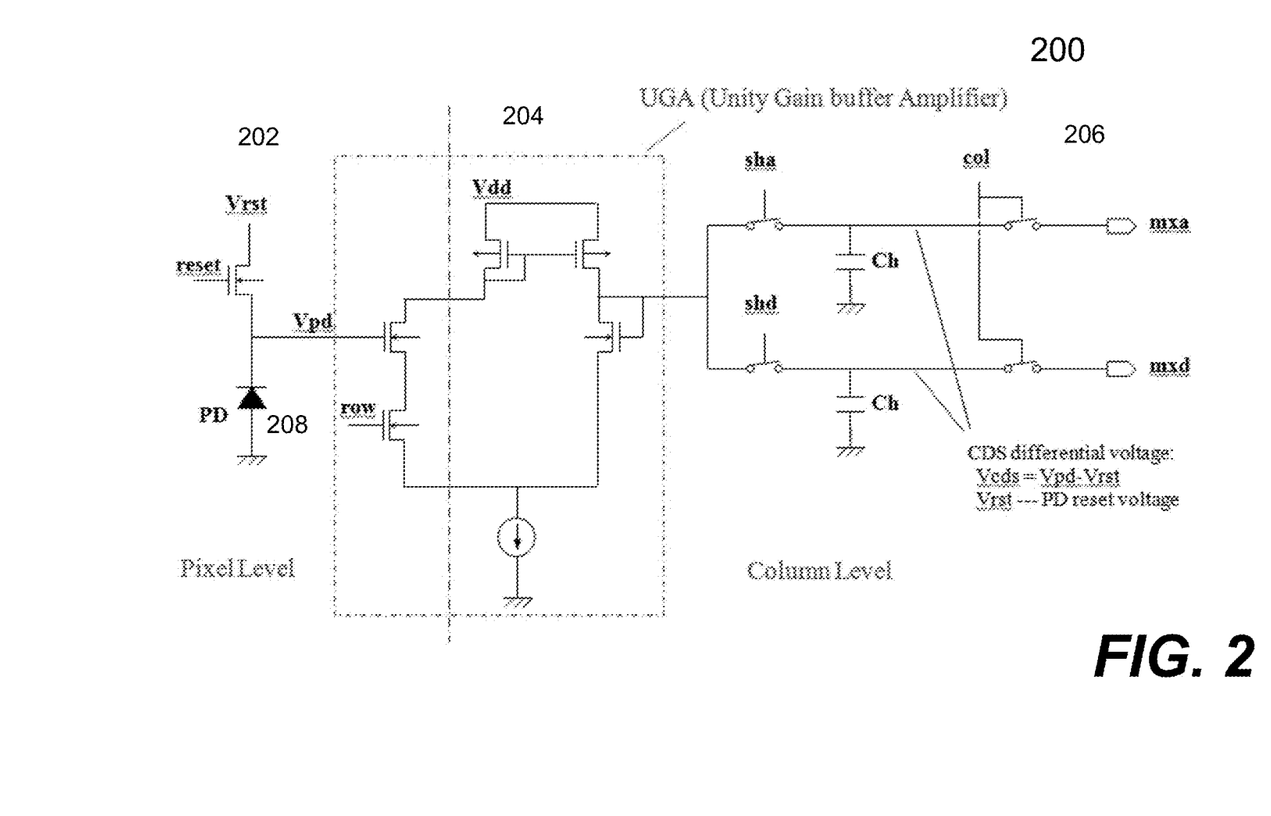
FIG. 2 shows an exemplary implementation of a CMOS pixel along with an amplifier and a readout circuit that may be used in FIG. 1A.

FIG. 2 shows an exemplary implementation 200 of a CMOS pixel 202 along with an amplifier 204 and a readout circuit 206 that may be used in FIG. 1A. As shown in FIG. 2, the amplifier 204 is a unity gain buffer amplifier (a.k.a., UGA) 204 and the readout circuit 206 is a correlated double sampling (CDS) circuit. It is well known in the art that a UGA circuit prevents drawing any current from an input attached to the input terminal of the UGA circuit but supplies whatever a current (up to what the operational amplifier can supply) is needed from the output of the UGA circuit at the output terminal of the UGA. It is also well known in the art that a CDS circuit is often used to remove an undesired offset when reading out sensor outputs. Accordingly, the output voltage Vpd from the photodiode 208 can be approximated by Vpd=Q/C, where Q means charges that can be accumulated on the photodiode 208 and C is the capacity that can hold the charges accumulated in proportional to the incoming light.

It is commonly known that $Q=J_L \times A \times \text{Tint}$ and $C=Cd*A$, wherein Jl is the current density which related to the intensity of the incoming light, A is the area of the photodiode 208, Cd is the depletion capacitance, and Tint is the integration time of the photodiode 208. Accordingly, the output voltage Vpd from the photodiode 208 can be derived as follows:

$$Vpd=Q/C=(J_L \times A) \times \text{Tint}/(Cd \times A)=J_L \times \text{Tint}/Cd$$

Thus it can be concluded that the output voltage Vpd from the photodiode 208 is relatively independent from the area of the photodiode 208. Accordingly, the subpixels as designed in FIG. 1B can contribute together to the total readout of the output voltage Vpd of the pixel 112, essentially four (4) times the original output voltage Vpd from the photodiode 202 in FIG. 1B.

Figure 3:
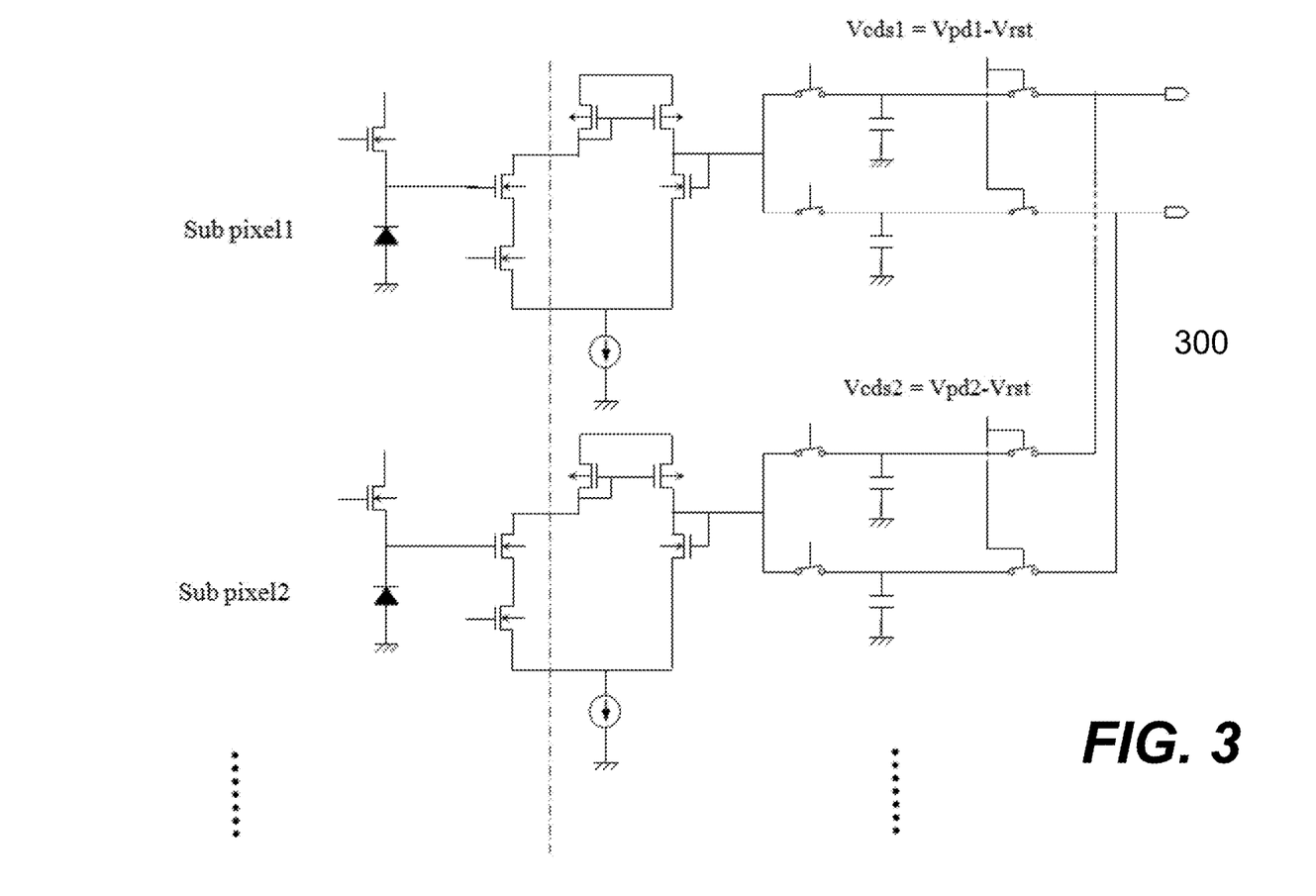
FIG. 3 shows a circuit diagram for a readout circuit that may be used in FIG. 1B to read out the four individual output voltage Vpd from the subpixels.
Figure 4:
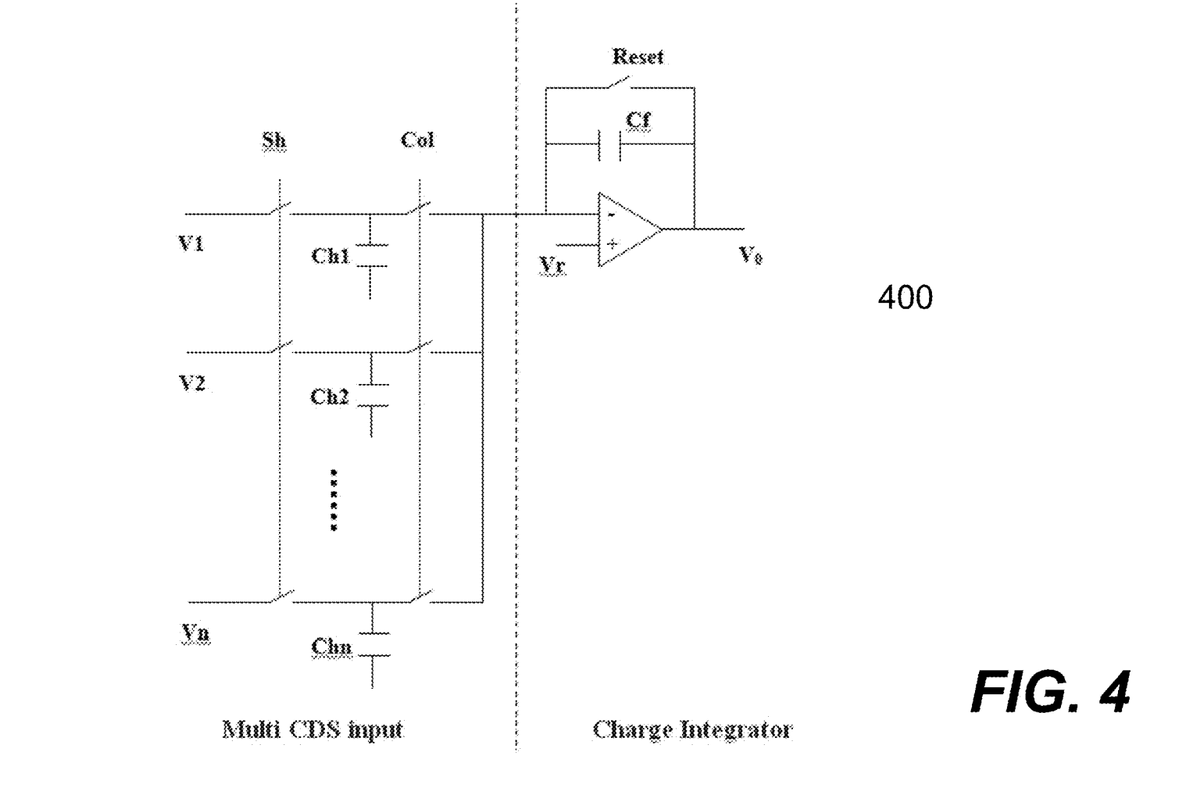
FIG. 4 shows a CDS circuit taking multiple inputs that may be used as a readout circuit in FIG. 3.

FIG. 3 shows a circuit diagram for a readout circuit 300 that may be used in FIG. 1B to read out the four individual output voltage Vpd from the subpixels. FIG. 4 shows a CDS circuit taking multiple inputs. It is assumed that there are n subpixels. Accordingly, the charges are respectively stored in n capacitors Ch1, Ch2, . . . , Chn of the n subpixels. The total charges Qt can be expressed in the following:

in sampling mode:

$$Qt = Q1 + Q2 + \ldots + Qn$$
$$= (V1-Vr) \times Ch1 + (V2-Vr) \times Ch2 + \ldots + (Vn-Vr) \times Chn$$

in readout mode: the charges are transferred to Cf, thus $$Qf = (Vr - Vo) \times Cf$$

In one embodiment, Qf=Qt, the output Vo is expressed as follows:

$$Vo = -[(V1-Vr) \times Ch1 + (V2-Vr) \times Ch2 + \ldots + (Vn-Vr) \times Chn]/Cf + Vr$$

It is supposed that V1=V2= . . . =Vn=Vi, and Ch1=Ch2= . . . =Chn=Ch, the output Vo can be rewritten as follows:

$$Vo = -nCh/Cf \times (Vi-Vr) + Vr$$

Thus it can be concluded that the signal of a pixel with n subpixels is read out with gain of −n Ch/Cf, where n is the number of the inputs to the CDS.

Figure 5:
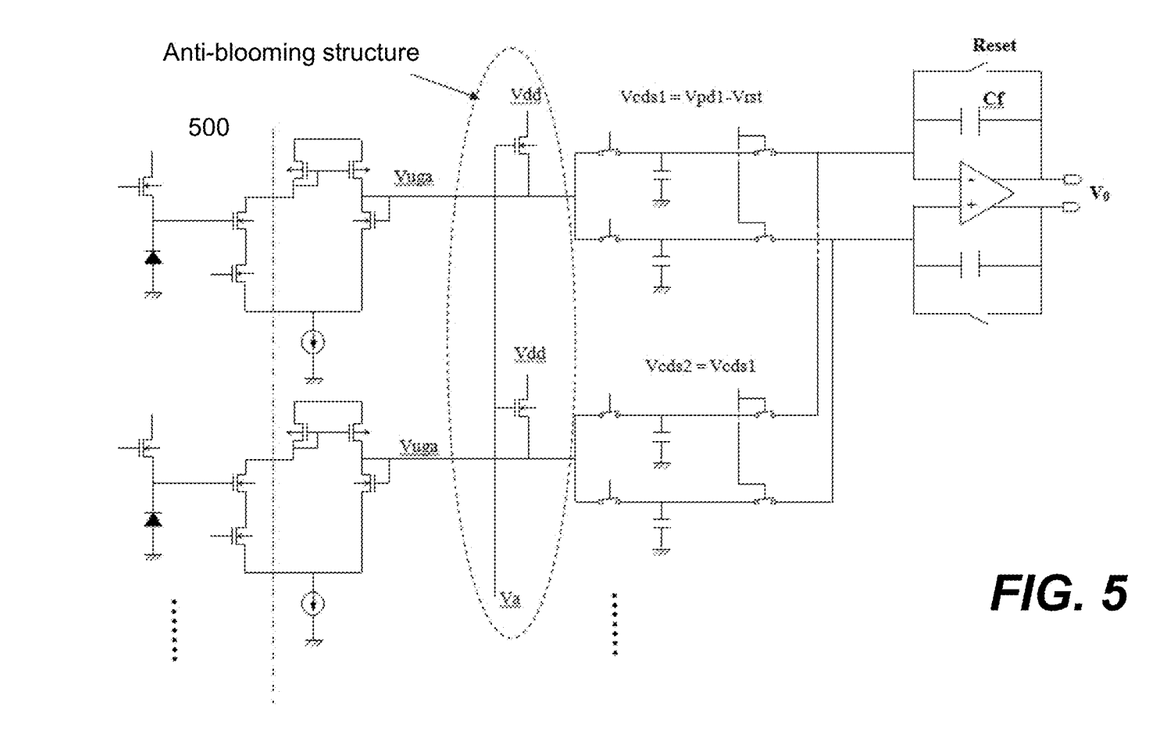
FIG. 5 shows an embodiment with an anti-blooming structure to prevent sensing signals of subpixels from being saturated when combined.

With the subpixel architecture or the combined outputs therefrom, an image sensor so implemented has an enhanced sensitivity when imaging in a low lighting condition. When in a bright lighting condition, an additional measure may be taken to prevent a pixel with the subpixel architecture from being saturated. FIG. 5 shows an embodiment with an anti-blooming structure 500 that is designed to present the sensing signals of the subpixels from being saturated when combined. For example, in a bright lighting condition, the sensing signals of the subpixels could be of high. When combining the sensing signals in the integrator, the output or final result from the integrator could be saturated, resulting in a useless signal.

The anti-blooming structure 500 is provided to ensure that each of the sensing signal does not exceed a predefined threshold (e.g., a voltage level). To prevent signal blooming, an appropriate Va is chosen to make Vcds<Vsat/N, wherein N is the number of subpixels in a single pixel, Va is defined as anti-blooming transistor gate voltage, Vcds is denoted as a CDS differential output, and Vcds1=Vcds2= . . . , =Vcds.

Figure 6A:
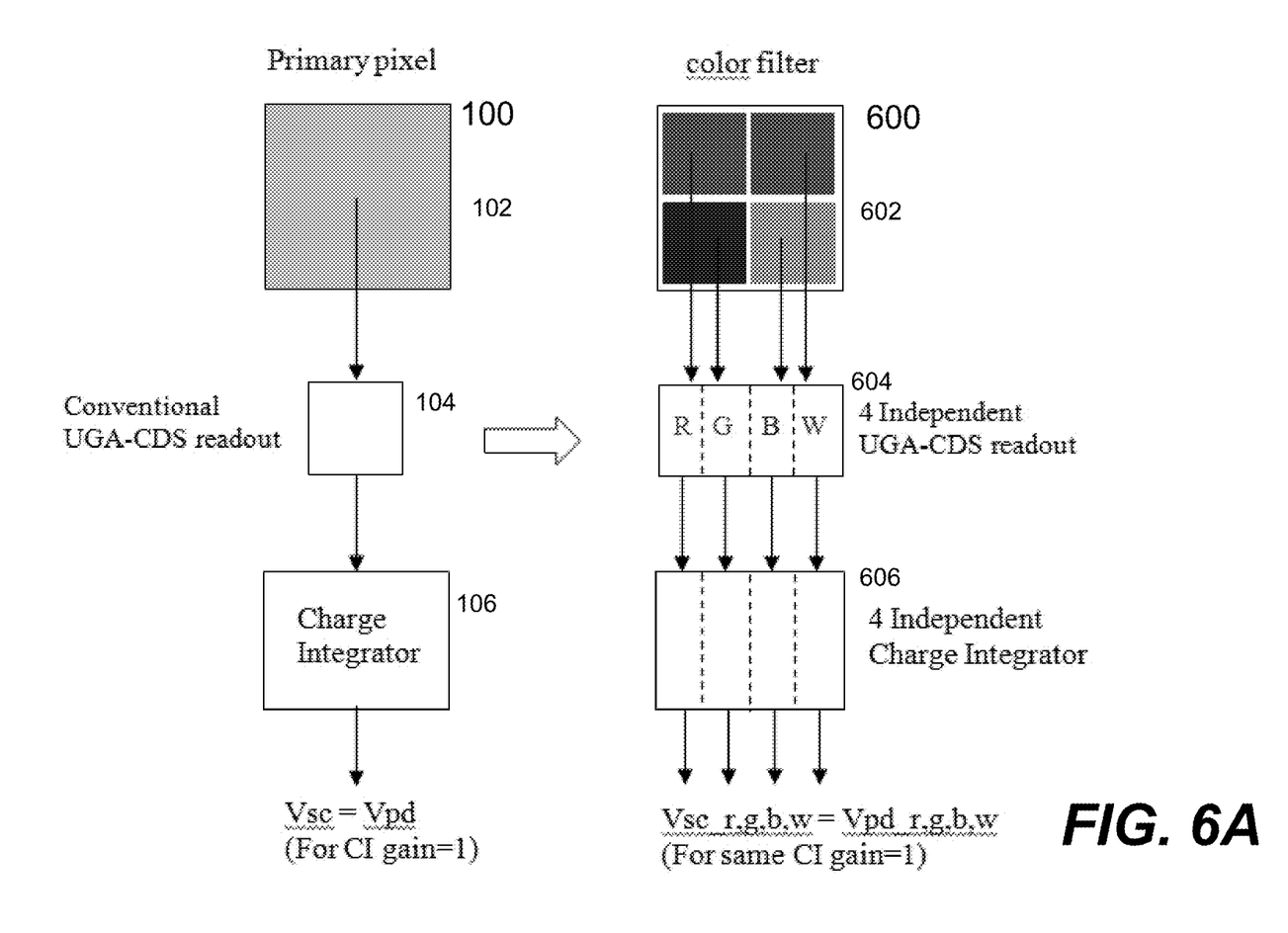
FIG. 6A shows another embodiment of using the subpixels to enhance the frequency response of the image sensor contemplated in the present invention.

Referring now to FIG. 6A, it shows another embodiment of using the subpixels to enhance the frequency response of the image sensor contemplated in the present invention. According to one embodiment, each of the pixels is coated with a filter designed to cover a frequency band. For illustration purpose as shown in FIG. 6A, a pixel 602 in an image includes four subpixels, respectively coated with red, green, blue and near-infrared (NIR) filters or red, green and blue filters with the fourth one having no filter at all. The subpixels are respectively read out by a corresponding number of readout circuits 604, and are then processed respectively by a corresponding number of charger integrators 606.

Different from a conventional CMOS image sensor for color image/video that typically uses a Bayer color pattern, an image sensor implemented with the pixel 600 is designed to cover four different frequency bands and has advantages including a broader frequency range covering not only the visible color spectrum but also some invisible spectrum, making the image sensor useful in many inspection applications (e.g., traffic surveillance in day and night).

Figure 6B:
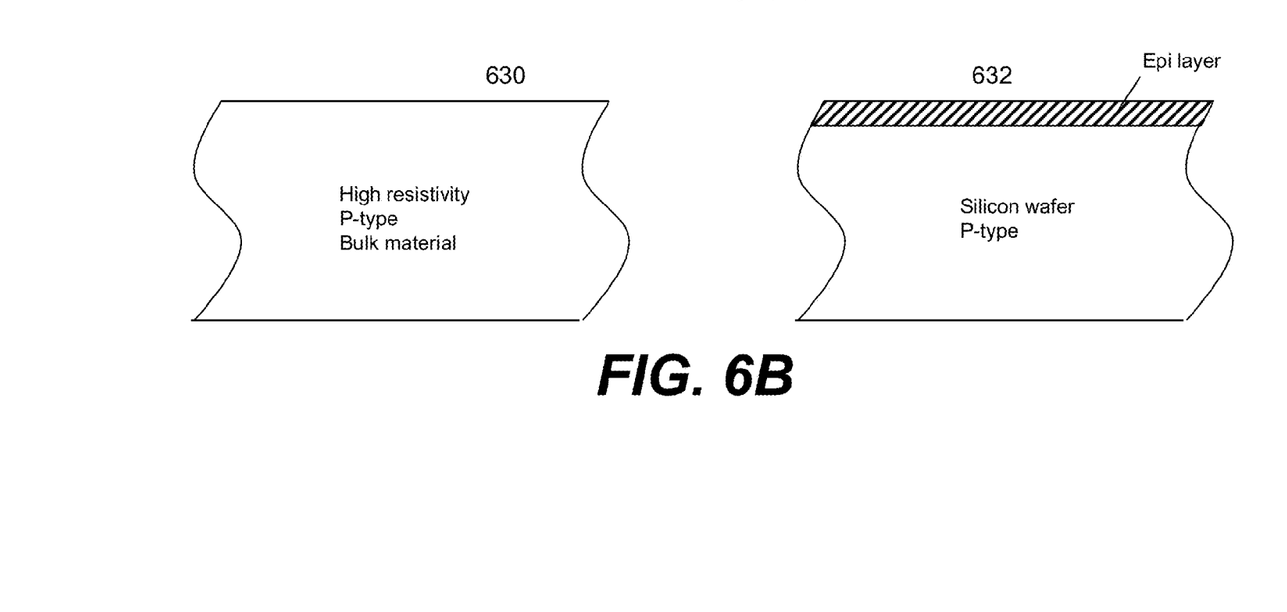
FIG. 6B shows a spectrum covering colors that can be reproduced by red, green and blue, typically visible in day time, and a near-infrared (NIR) area, typically visible in dark or very low lighting condition, along with two exemplary silicon materials that may be used for the NIR area.

FIG. 6B shows a spectrum 620 covering colors 622 that can be reproduced by red, green and blue, typically visible in day time, and a near-infrared (NIR) area 624, typically visible in dark or very low lighting conditions. The colors can reproduced from sensing signals in day time when the lighting condition is relative bright. When the lighting condition is low, the colors 622 can no longer reproduced from the sensing signals, the NIR area 624 can be seen. As a result, the image sensor implemented with the pixel structure 600 can be readily used for lighting conditions that may change dramatically.

Depending on implementation, the fourth pixel in the pixel structure 600 may be coated with a NIR filter or no filter at all. According to one embodiment as shown in FIG. 6B, the silicon material 630 or 632 itself may serve to transmit the light in the NIR band, thus there is no filter needed for the fourth subpixel.

Figure 7A:
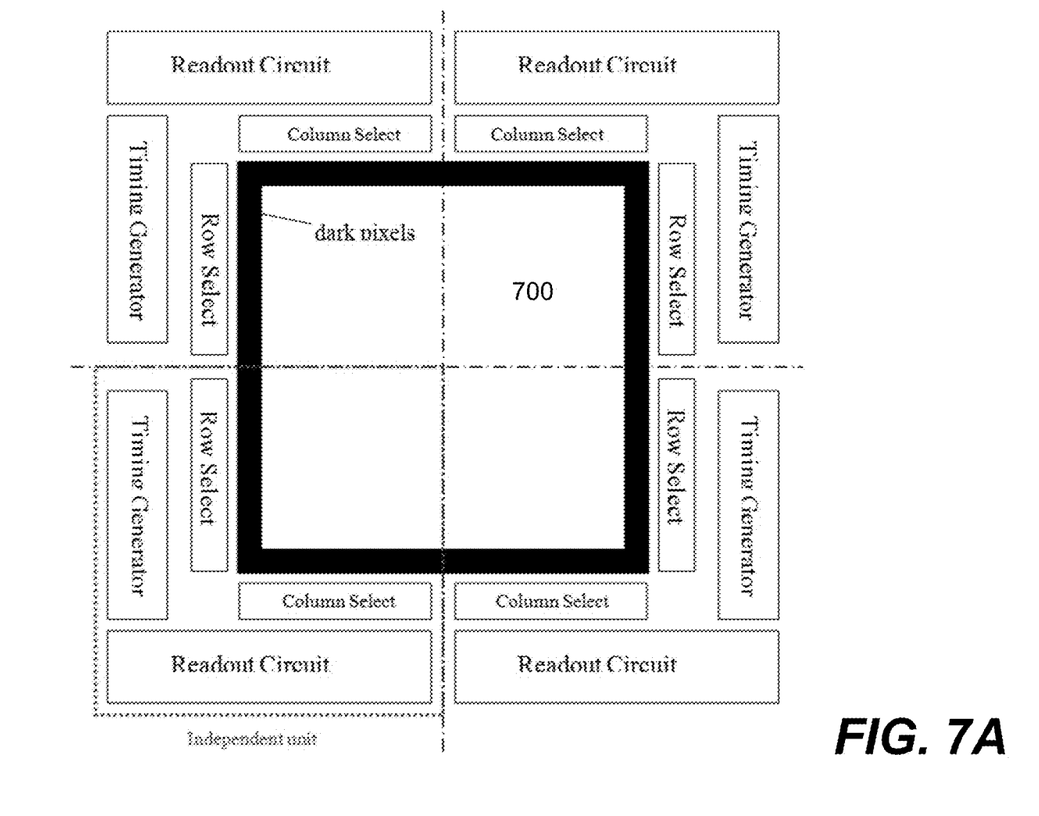
FIG. 7A shows an image sensor being supported by four readout circuits, each of the readout circuits operating independently, where the image sensor is virtually divided into four sensing areas.
Figure 7B:
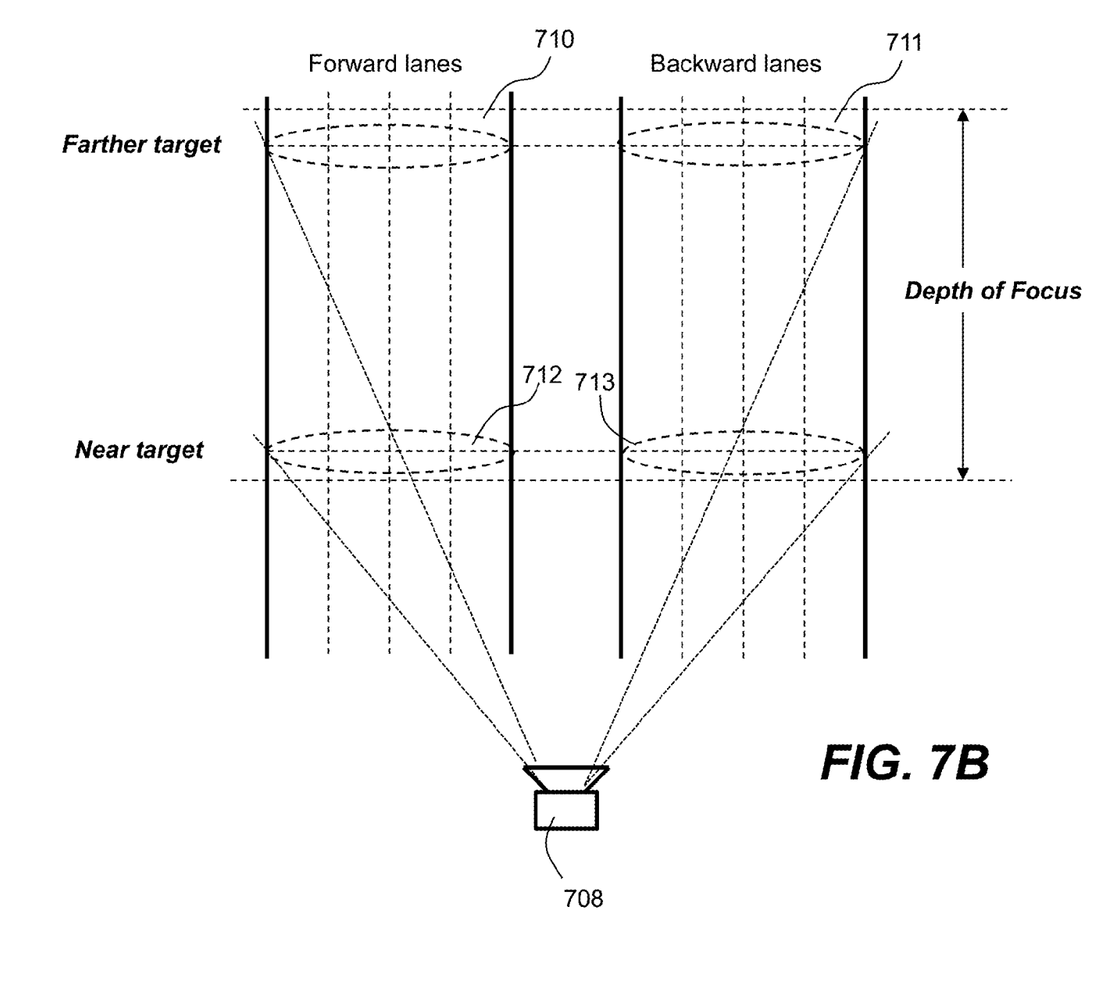
FIG. 7B shows an illustration of a freeway segment in which there are four forward lanes and backward lanes with respect to a camera employing the image sensor of FIG. 7A.

Referring now to FIG. 7A, it shows an image sensor 700 being supported by four readout circuits, each of the circuits operating independently with different integration times. In one embodiment of the present invention, the image sensor 700 is virtually divided into four parts (sensing areas). With a properly-adjusted integration time (e.g., determined by an average sensing signal of the entire sensing area in one part), each of the parts in the image sensor 700 may be used to image a different target. FIG. 7B shows an illustration of a freeway segment in which there are four forward lanes and four backward lanes with respect to a camera 708 employing the image sensor 700. Thus two parts of the image sensor 700 are being focused onto two far fields 710-711 covering all eight lanes while the other two parts of the image sensor 700 are being focused onto two near fields 712-713 covering all eight lanes as well. Thus with one camera 708, the freeway segment can be closely monitored. Further, the installation of such a camera will be much easier and lower in cost than the conventional way of installing an overhead structure across the lanes to support multiple cameras, each monitoring one lane or two lanes.

Figure 7C:
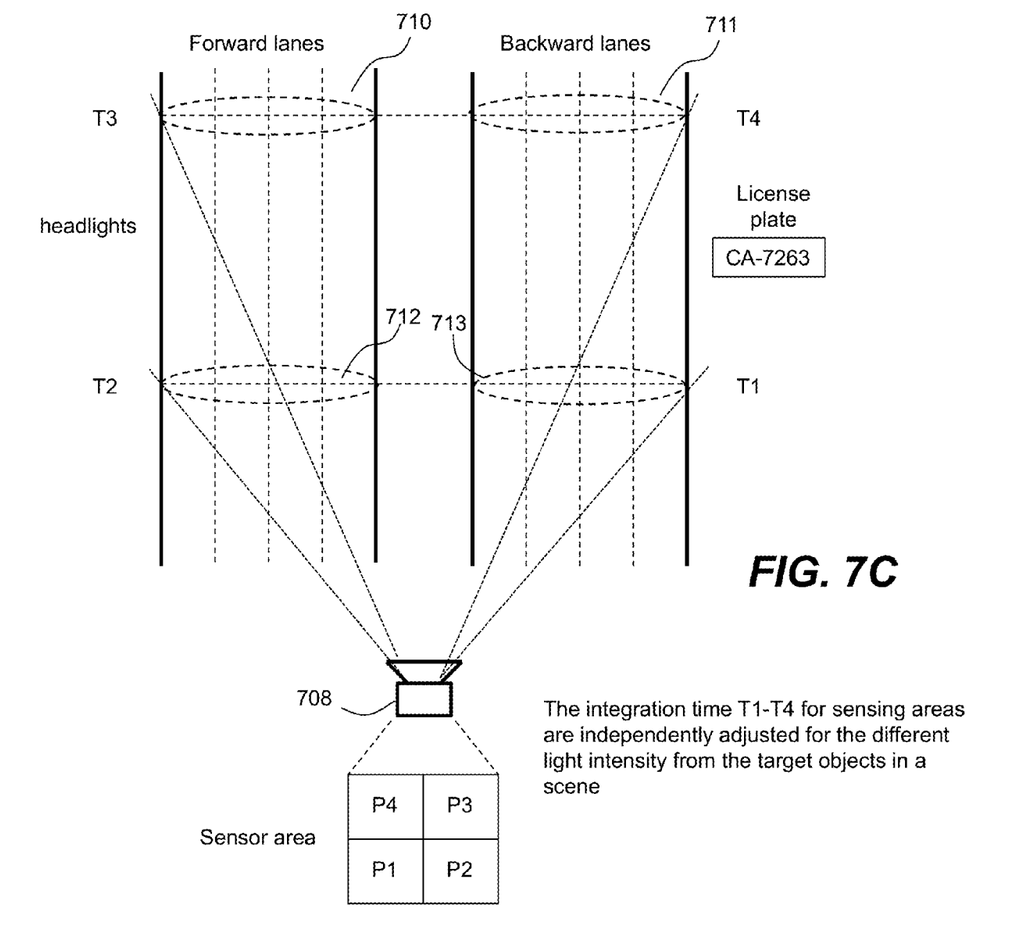
FIG. 7C shows an exemplary application of controlling different integration times for the divided sensing areas to monitor multiple targets.

In operation, each of the parts in the image sensor 700 controlled with an appropriate integration time is provided with a readout circuit to facilitate the sensing signals to be read out for subsequent processing. FIG. 7C replicates FIG. 7B to show how the four parts of an image sensor are configured to monitor the eight forward lanes and backward lanes. In day time, the integration times T1 and T2 for the sensing parts P1 and P2 may be adjusted similarly so that the images read out from the parts P1 and P2 are focused near the focal planes 712 and 713 while the integration times T3 and T4 for the sensing parts P3 and P4 may be adjusted similarly so that the images read out from the parts P3 and P4 are focused near the focal planes 710 and 711. It should be noted that although all sensing parts P1-P4 are exposed, images or videos from the proper integrations would be useful, thus realizing one image sensor to monitor multiple targets.

For example, T1=T2=tn and T3=T4=tf while tf>tn. In operation, when t=tn, sensing signals are read out from the sensing parts P1 and P2. Although the sensing signals may also be read out from the parts P3 and P4, the sensing signals will not be useful as they are underexposed. When t=tf, sensing signals are read out from the sensing parts P3 and P4. Although the sensing signals may still be read out from the parts P1 and P2, the sensing signals would not be useful as they are now overexposed. Likewise, in the evening, the incoming lights from the forward lanes (e.g., mostly reflections from the license plates and tail lights) are substantially lower than that from the backward lanes (e.g., mostly the headlights), the integration times T1-T4 may all be adjusted differently to ensure that the sensing signals read out from the corresponding sensing parts P1-P4 are from proper exposure to the predefined focused or monitored areas in the scene.

According to one embodiment, the image sensor 700 is implemented according to the pixel of FIG. 1B, thus the sensitivity of the image sensor 700 is considerably enhanced, making it more suitable for surveillance applications in dynamic changes of the lighting conditions, such as traffic surveillance in day and night.

It should be noticed that the implementation of the image sensor 700 is not limited to the pixel of FIG. 1B. Those skilled in the art may appreciate that the virtual dividing an image sensor with individual readout circuits may be applied to other types of image sensors. However, using the subpixel structure as shown in FIG. 1B will enhance the sensitivity of the image sensor 700 without increasing the area of the image sensor 700.

Although exemplary embodiments of the present invention have been disclosed in detail, it will be apparent to those skilled in the art that various changes and modifications may be made to achieve the advantage of the invention. It will be obvious to those skilled in the art that some components may be substituted with another component providing same function. Accordingly, the scope of the present invention is defined by the appended claims rather than the foregoing description of embodiments.

We claim:

1. A camera for monitoring multiple targets, the camera comprising:
    an image sensor being divided into N non-overlapping sensing areas respectively controlled by N integration times to ensure that each of the sensing areas outputs a properly-exposed sensing signal when the camera is operated to sense a scene,
    wherein the image sensor includes an array of pixels, each of the pixels includes:
      M subpixels, coupled respectively to M readout circuits, producing M pixel-level sensing signals, each of the M readout circuits coupled to one of the M subpixels to read out one of the M pixel-level sensing signals therefrom;
      an integrator provided to combine the M pixel-level sensing signals of the M subpixels to produce a final pixel-level sensing signal of the each of the pixels, wherein M anti-blooming circuits are provided to ensure each of the M pixel-level sensing signals does not exceed a predefined threshold before the M pixel-level sensing signals are combined in the integrator; and
    N readout circuits, each of the N readout circuits coupled to one of the sensing areas to read out the properly-exposed sensing signal therefrom when the camera is operated to sense a scene including the multiple targets.

2. The camera as recited in claim 1, wherein sensing signals generated from a first set of the sensing areas of the image sensor are processed to monitor a first part of the scene, and sensing signals generated from a second set of the sensing areas of the image sensor are processed to monitor a second part of the scene.

3. The camera as recited in claim 2, wherein N is set to be two, and the first part of the scene is from a near field, and the second part of the scene is from a far field, two readout circuits read out independently two respective sensing signals from the camera.

4. The camera as recited in claim 2, wherein N is set to be four, and the first part of the scene is from a near field, and the second part of the scene is from a far field, four readout circuits read out independently four respective sensing signals from the sensing areas exposed to the scene with four independent integration times in the camera.

5. The camera as recited in claim 4, wherein the camera is deposed to monitor a two-way road with at least one forward lane and at least one backward lane, two sensing areas of the image sensor are being focused at both of the forward and backward lanes in the near field to provide a high resolution of view of the forward and backward lanes, and the other two sensing areas of the image sensor are being focused at both of the forward and backward lanes in the far field to provide an overview of the forward and backward lanes.

6. The camera as recited in claim 5, wherein the camera is installed between the forward and backward lanes.

7. The camera as recited in claim 2, wherein N sensing signals from the N readout circuits are coupled to a system provided to process the N sensing signals individually to provide views of N parts of the scene.

8. The camera as recited in claim 7, wherein each of the N sensing areas is controlled to expose to the scene with an integration time determined from an average signal across the each of the N sensing areas.

9. The camera as recited in claim 1, wherein sensitivity of the image sensor or the pixel is enhanced by M times without increasing an area of the image sensor.

10. The camera as recited in claim 1, wherein M is four, three of the four subpixels are respectively coated with red, green and blue filters, thus the sensing signals from the three of the four subpixels are sufficient to reproduce color images of the scene, another one of the four subpixels has no filter and is provided to detect objects in very low lighting condition.

11. The camera as recited in claim 1, wherein the camera is coupled to a system configured to control M column and row selection circuits in the image sensor to read off the sensing signals of the M non-overlapping sensing areas according to a predefined scanning scheme.

* * * * *